US011106375B2

(12) United States Patent
Narayanamurthy et al.

(10) Patent No.: US 11,106,375 B2
(45) Date of Patent: Aug. 31, 2021

(54) DEDUPLICATION OF ENCRYPTED DATA WITHIN A REMOTE DATA STORE

(71) Applicant: NetApp Inc., Sunnyvale, CA (US)

(72) Inventors: Srinivasan Narayanamurthy, Cary, NC (US); Parag Deshmukh, Bangalore (IN)

(73) Assignee: NetApp, Inc., San Jose, CA (US)

( * ) Notice: Subject to any disclaimer, the term of this patent is extended or adjusted under 35 U.S.C. 154(b) by 203 days.

(21) Appl. No.: 16/374,787

(22) Filed: Apr. 4, 2019

(65) Prior Publication Data
US 2020/0320046 A1 Oct. 8, 2020

(51) Int. Cl.
| | |
|---|---|
| *G06F 17/00* | (2019.01) |
| *G06F 3/06* | (2006.01) |
| *H04L 9/06* | (2006.01) |
| *G06F 17/18* | (2006.01) |
| *H04L 9/08* | (2006.01) |
| *G06F 16/215* | (2019.01) |
| *G06F 16/901* | (2019.01) |
| *G06F 21/60* | (2013.01) |

(52) U.S. Cl.
CPC ............ *G06F 3/0641* (2013.01); *G06F 3/067* (2013.01); *G06F 3/0608* (2013.01); *G06F 16/215* (2019.01); *G06F 16/9027* (2019.01); *G06F 17/18* (2013.01); *G06F 21/602* (2013.01); *H04L 9/0643* (2013.01); *H04L 9/0822* (2013.01)

(58) Field of Classification Search
None
See application file for complete search history.

(56) References Cited

U.S. PATENT DOCUMENTS

| | | | | |
|---|---|---|---|---|
| 8,290,972 | B1* | 10/2012 | Deshmukh | G06F 16/24556 707/758 |
| 9,053,124 | B1* | 6/2015 | Dornquast | G06F 11/1453 |
| 9,298,726 | B1* | 3/2016 | Mondal | G06F 3/0608 |
| 9,342,465 | B1* | 5/2016 | Meiri | G06F 3/06 |
| 10,397,185 | B1* | 8/2019 | Sandholm | H04L 63/101 |
| 2008/0104146 | A1* | 5/2008 | Schwaab | G06F 16/1756 |
| 2012/0204024 | A1* | 8/2012 | Augenstein | G06F 21/602 713/150 |
| 2014/0129830 | A1* | 5/2014 | Raudaschl | G06F 21/6272 713/165 |
| 2014/0189348 | A1* | 7/2014 | El-Shimi | G06F 21/6218 713/165 |
| 2015/0127950 | A1* | 5/2015 | Irvine | H04L 9/0662 713/184 |

(Continued)

*Primary Examiner* — Hasanul Mobin

(74) *Attorney, Agent, or Firm* — Cooper Legal Group, LLC

(57) ABSTRACT

Techniques are provided for deduplicating encrypted data. For example, a device has data to store in an encrypted state within a remote data store. A key is used to encrypt the data to create encrypted data. The data is hashed to create hashed data and the encrypted data is hashed to create hashed encrypted data. A probabilistic data structure of the data is generated. The key is encrypted based upon the data to create an encrypted key. The encrypted data is transmitted to the remote data store, along with metadata comprising the hashed data, the hashed encrypted data, the probabilistic data structure, and the encrypted key. The metadata may be used to implement deduplication for subsequent requests, to store data within the remote data store, with respect to the encrypted data.

20 Claims, 19 Drawing Sheets

(56) References Cited

U.S. PATENT DOCUMENTS

2016/0077977 A1* 3/2016 Narayanamurthy .. H04L 9/3239
713/193
2016/0291891 A1* 10/2016 Cheriton ................. G06F 3/064
2019/0349426 A1* 11/2019 Smith ..................... H04L 45/20

* cited by examiner

DEDUPLICATION OF ENCRYPTED DATA WITHIN A REMOTE DATA STORE

BACKGROUND

Many users are storing data within remote data stores, such as a cloud computing environment or any other computing environment/architecture accessible over a network to devices. For example, users may backup email data, store videos, store files, maintain business data, and/or a variety of other data within remote data stores. Each user may utilize their own key for encrypting data before the data is transmitted to a remote data store, thus improving security for the data during transmission over a network to the remote data store. Encryption generally attempts to reduce the frequency of the same data within encrypted data to improve security against frequency based attacks and cryptanalysis. Because of this, encrypted data provides poor deduplication and compression ratios because deduplication and compression look for higher relative frequency of the same data so that the same data can be easily deduplicated or compressed.

Because the remote data store is receiving encrypted data from devices of users that may use different keys for encryption that are not shared with the remote data store, the remote data store is unable to decrypt the encrypted data in order to perform deduplication and compression that would provide desirable deduplication and compression ratios. Thus, the remote data store may store a lot of redundant encrypted data, which wastes significant amounts of storage resources (e.g., multiple users may upload the same video, multiple users may be associated with the same email attachment, etc.).

DETAILED DESCRIPTION

Figure 1:
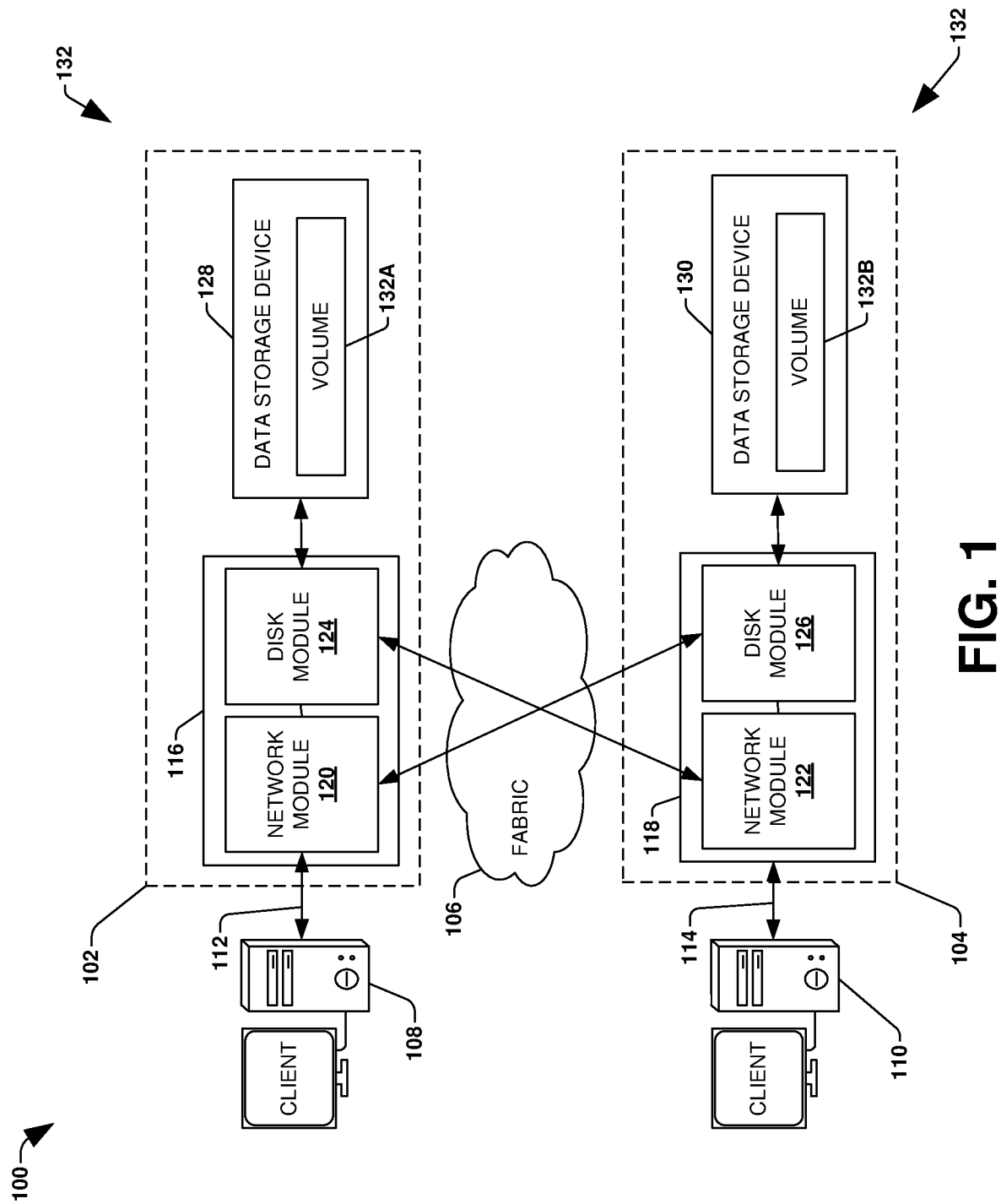
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A remote data store, such as a cloud computing environment or any other computing environment remotely accessible to devices over a network, may receive and store encrypted data from the devices. Each user of the remote data store may utilize their own key for encryption, which is kept secret from the remote data store and/or other users (e.g., the remote data store may be an untrusted $3^{rd}$ party service not controlled by and executing on computers owned by a user). The remote data store is unable to adequately deduplicate and/or compress encrypted data because encrypted data does not provide good deduplication and compression ratios (e.g., encryption will increase entropy of data, which is an undesirable characteristic for obtaining good deduplication and compression ratios). Thus, the remote data store may waste substantial amounts of storage resources storing redundant data, such as the same email attachments, videos, images, documents, or any other type of data.

Accordingly, as provided herein, deduplication is provided by the remote data store for encrypted data. Encryption and deduplication may be accomplished using standard encryption techniques in a manner where a user's key is kept secret from the remote data store and other users that do not have the same data. The encrypted data is maintained within the remote data store in a manner that protects against plain text attacks. Security is enhanced because a mere hash of data is not enough to show proof of ownership that another user has the same data already stored within the remote data store as another user. Because encrypted data is being transmitted from devices to the remote data store, end-to-end encryption is provided. Deduplication is provided within the remote data store across encrypted data of multiple users in a secure manner because users must provide qualifying proof of data possession before their data can be deduplicated with respect to data already stored within the remote data store. That is, a device and the remote data store may exchange various metadata information in order to determine whether the device is attempting to store data already stored as encrypted data within the remote data store. If the device and remote data store successfully determine that the data is duplicate, the device does not transmit the duplicate data to the remote data store, and the remote data store instead stores a reference on behalf of the device to the already stored encrypted data, thus achieving deduplication of encrypted data during transmission and storage.

To provide for deduplicating encrypted data, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that deduplicating encrypted data may be implemented within the clustered network environment 100. It may be appreciated that deduplicating encrypted data may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
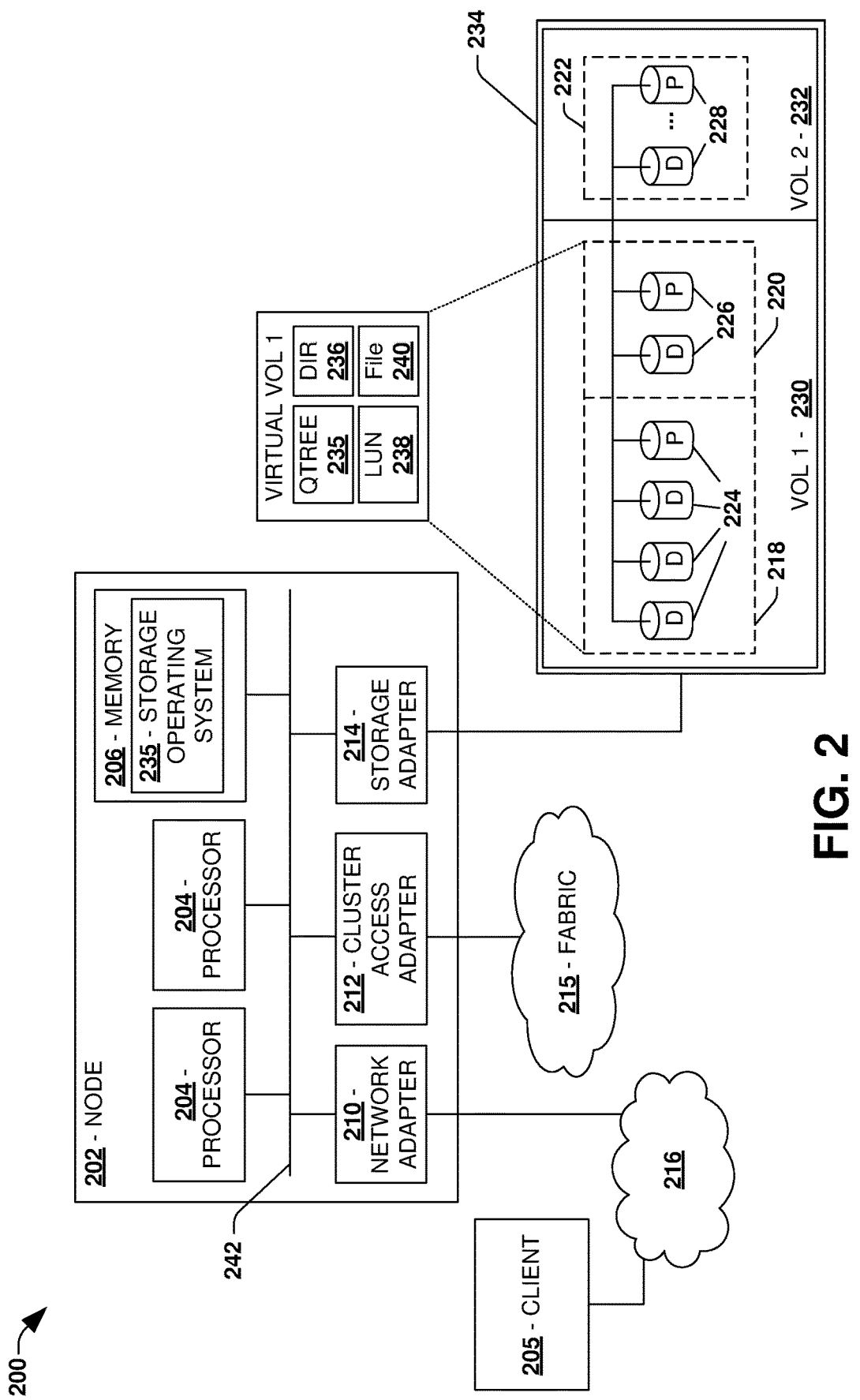
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that deduplicating encrypted data may be implemented for the data storage system 200. It may be appreciated that deduplicating encrypted data may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
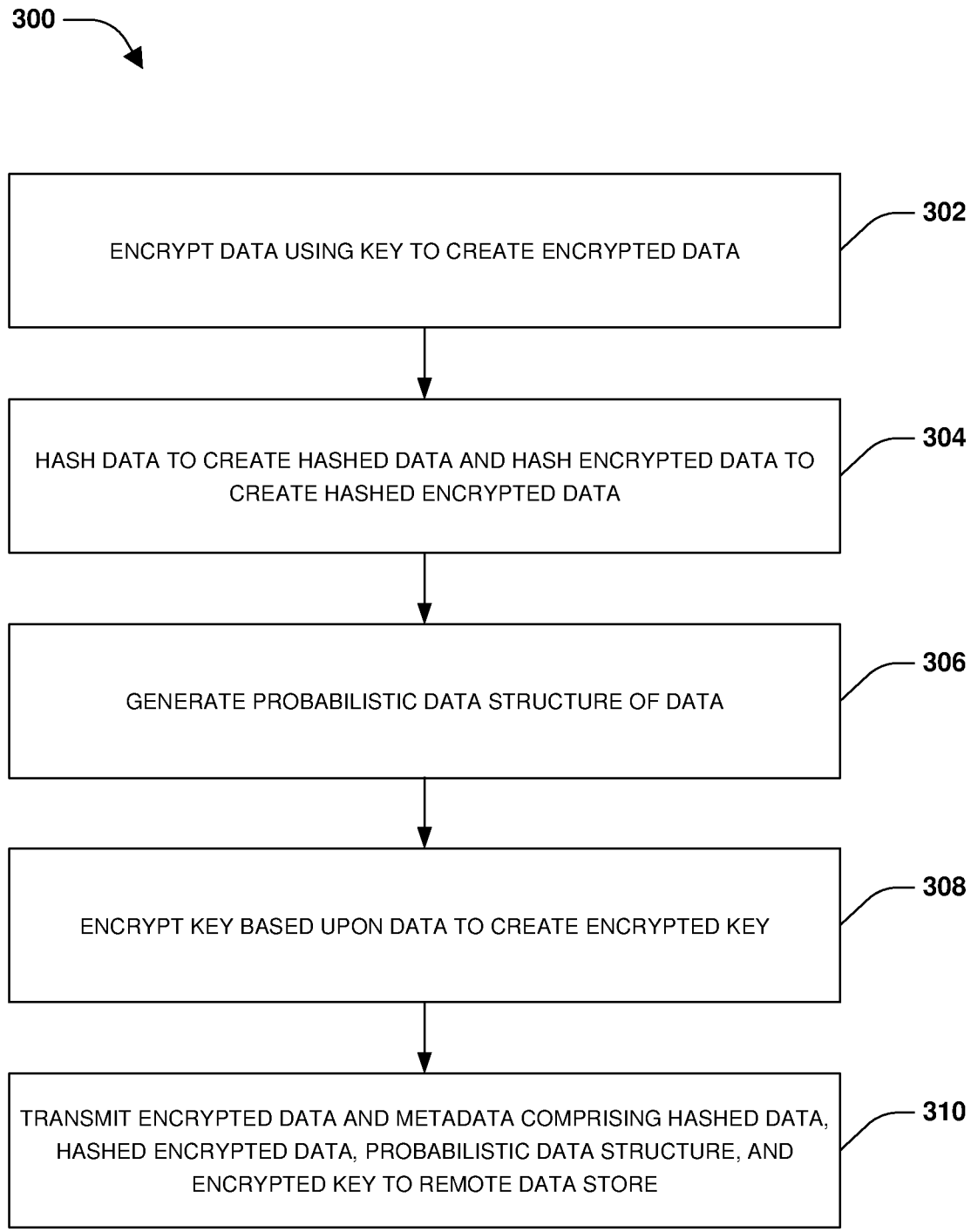
FIG. 3 is a flow chart illustrating an example method for deduplicating encrypted data.
Figure 4A:
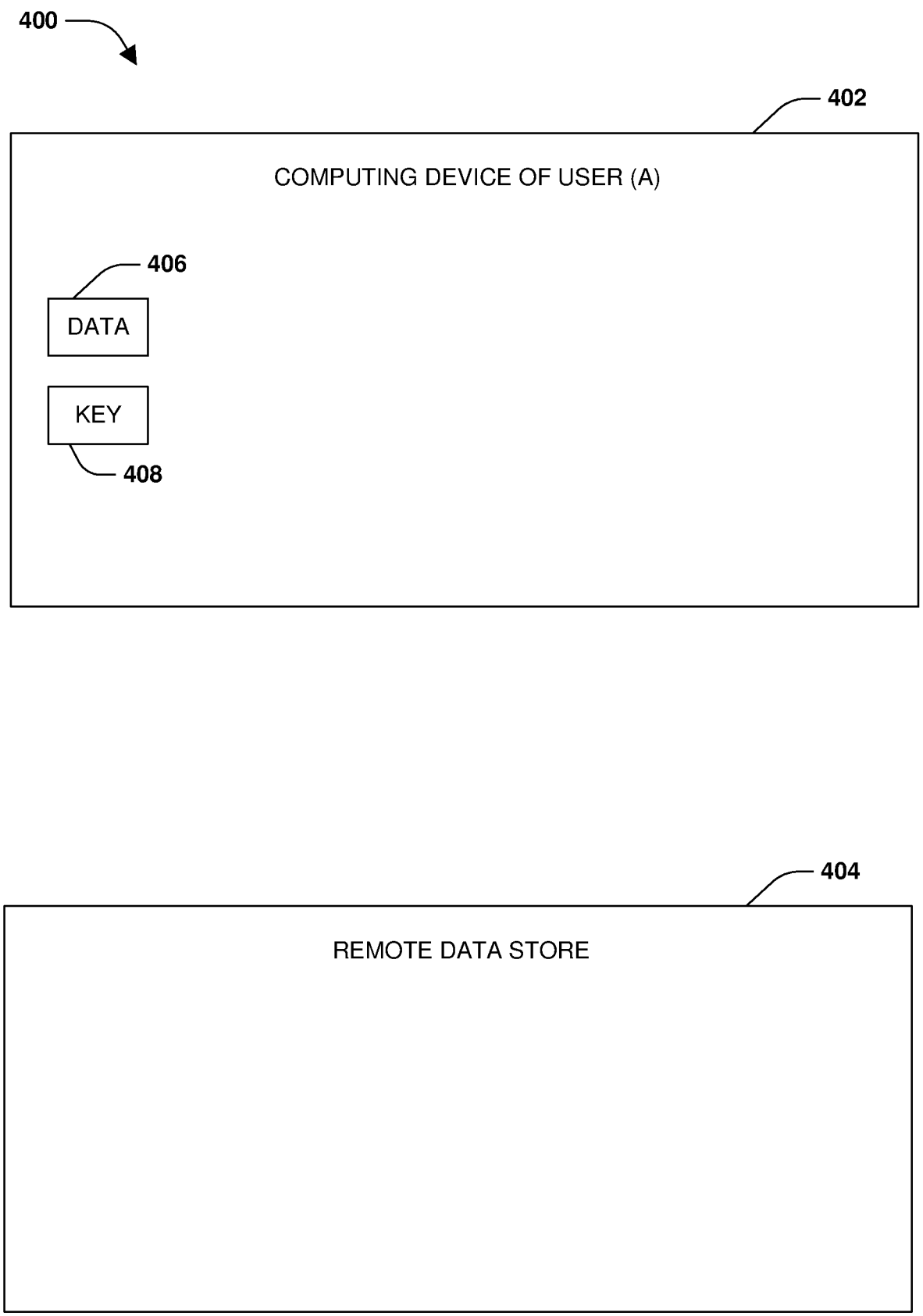
FIG. 4A is a component block diagram illustrating an example system for deduplicating encrypted data.
Figure 4B:
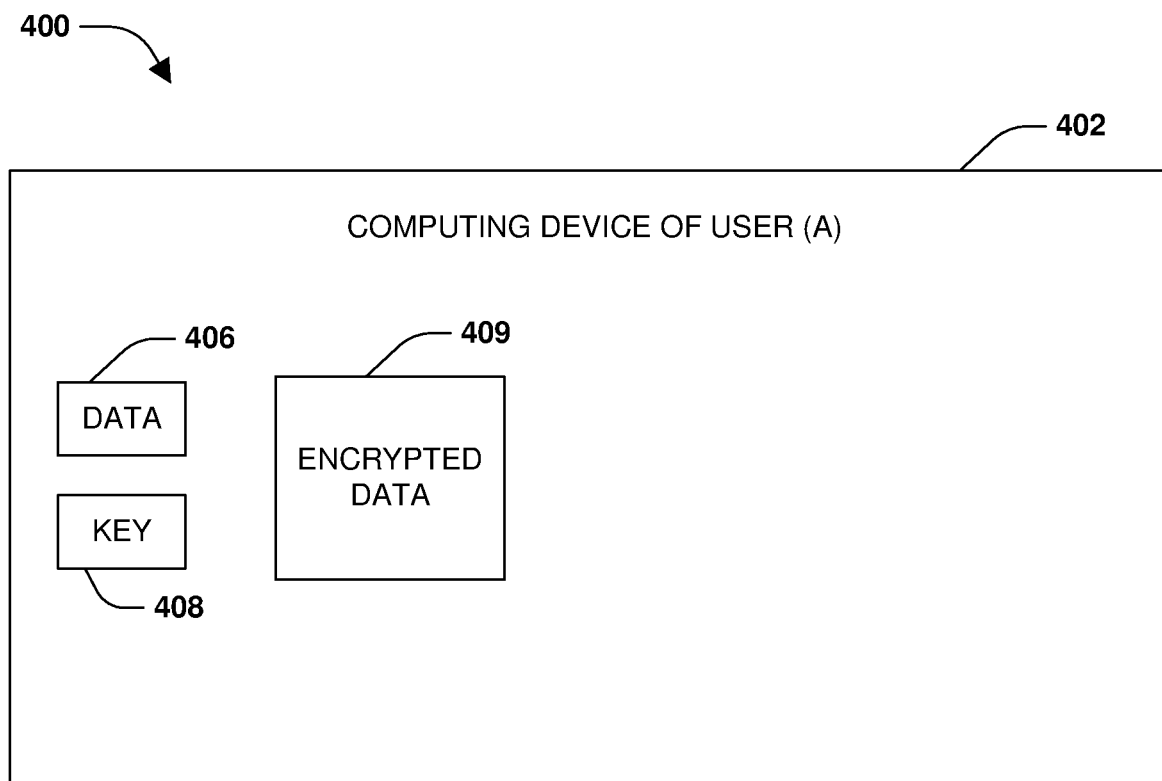
FIG. 4B is a component block diagram illustrating an example system for deduplicating encrypted data, where encrypted data is created.
Figure 4B:
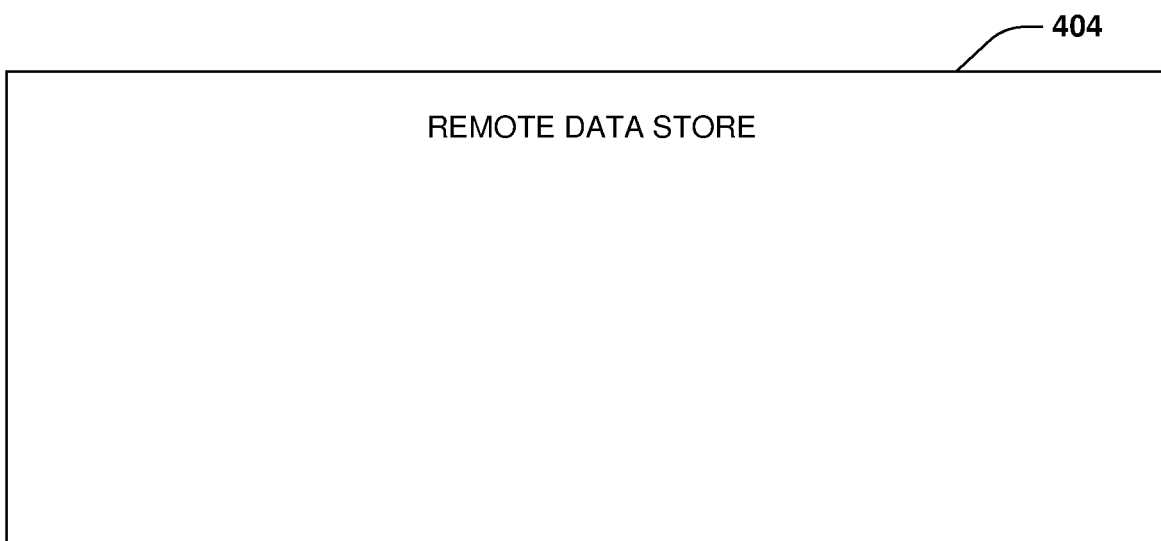
Figure 4C:
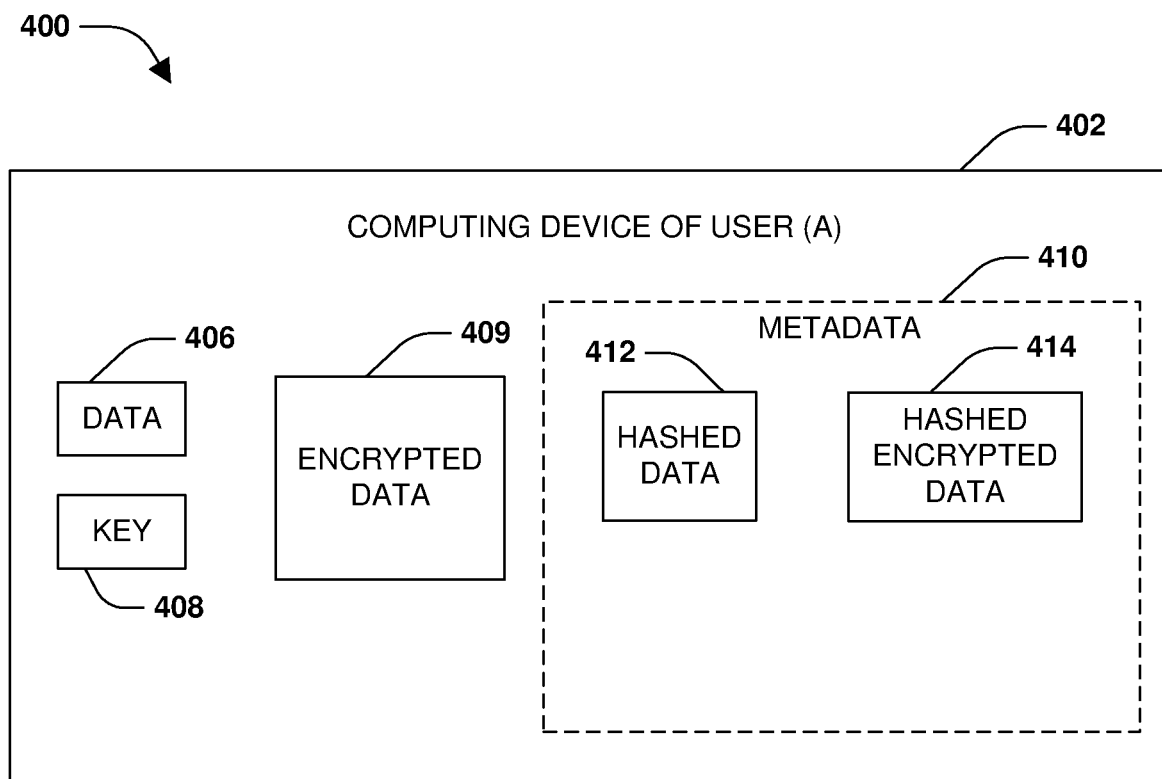
FIG. 4C is a component block diagram illustrating an example system for deduplicating encrypted data, where hashed data and hashed encrypted data is created.
Figure 4C:
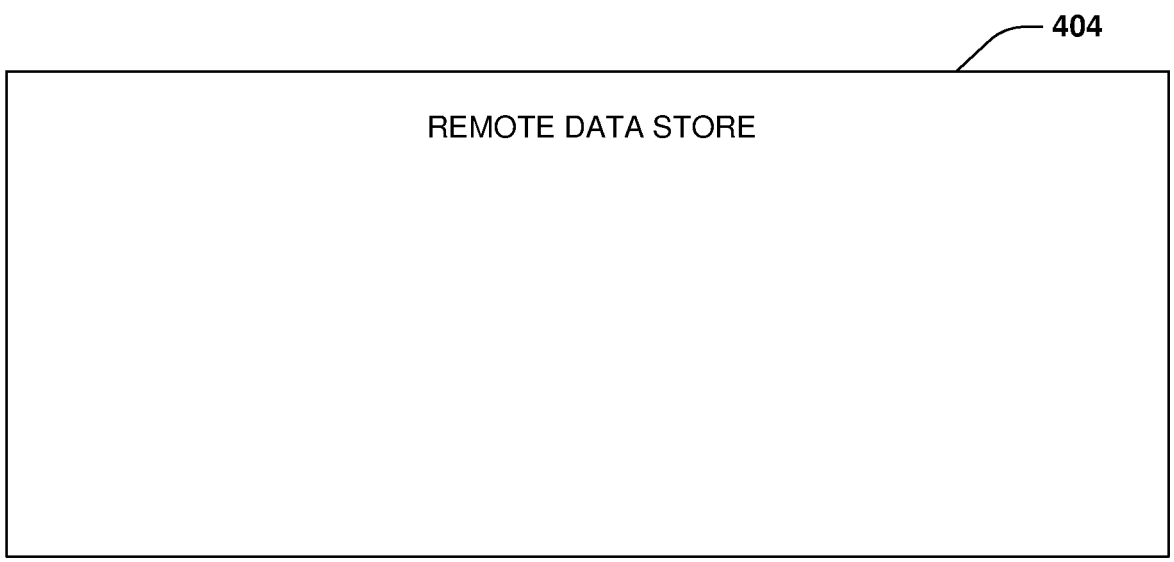
Figure 4D:
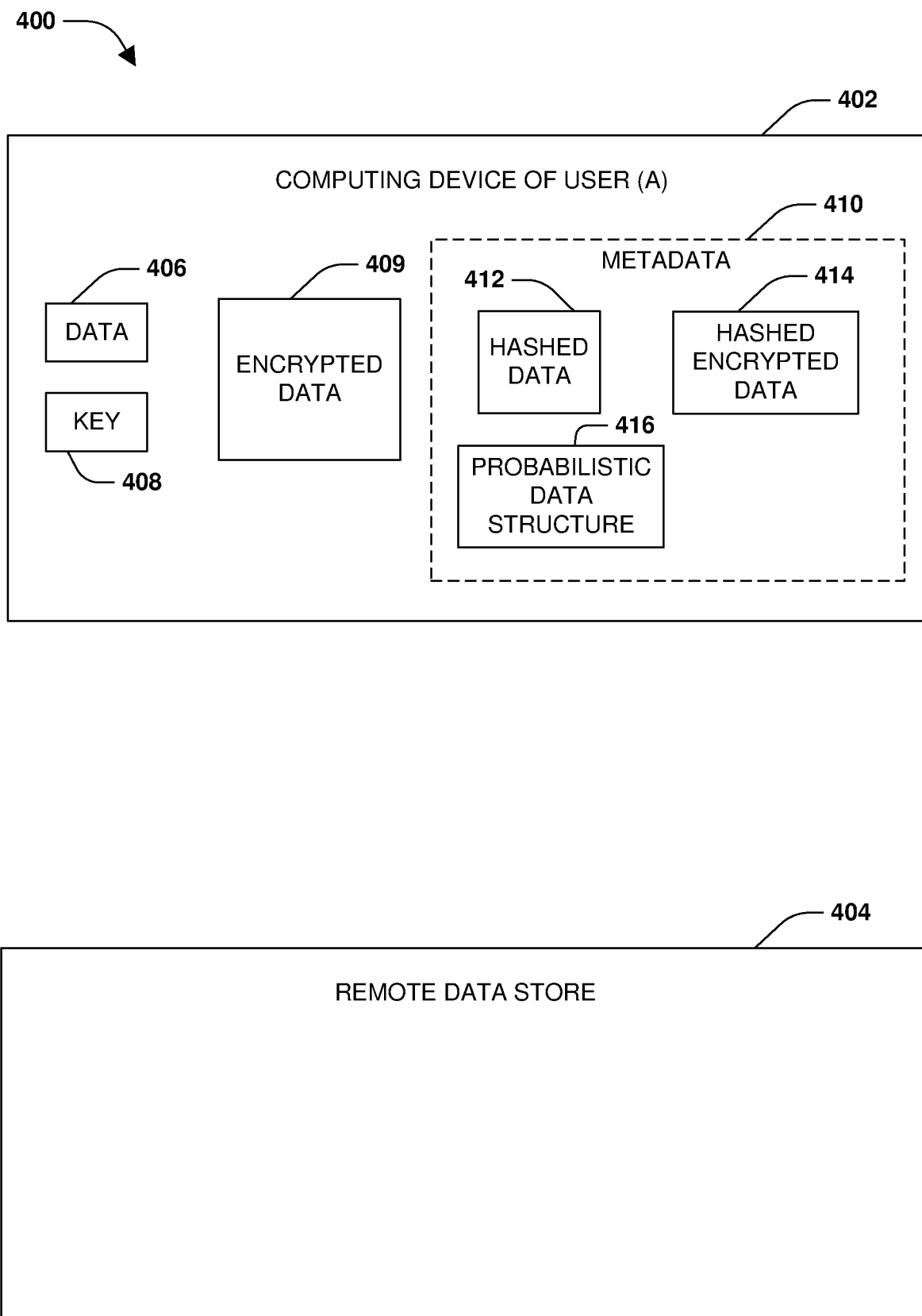
FIG. 4D is a component block diagram illustrating an example system for deduplicating encrypted data, where a probabilistic data structure is created.
Figure 4E:
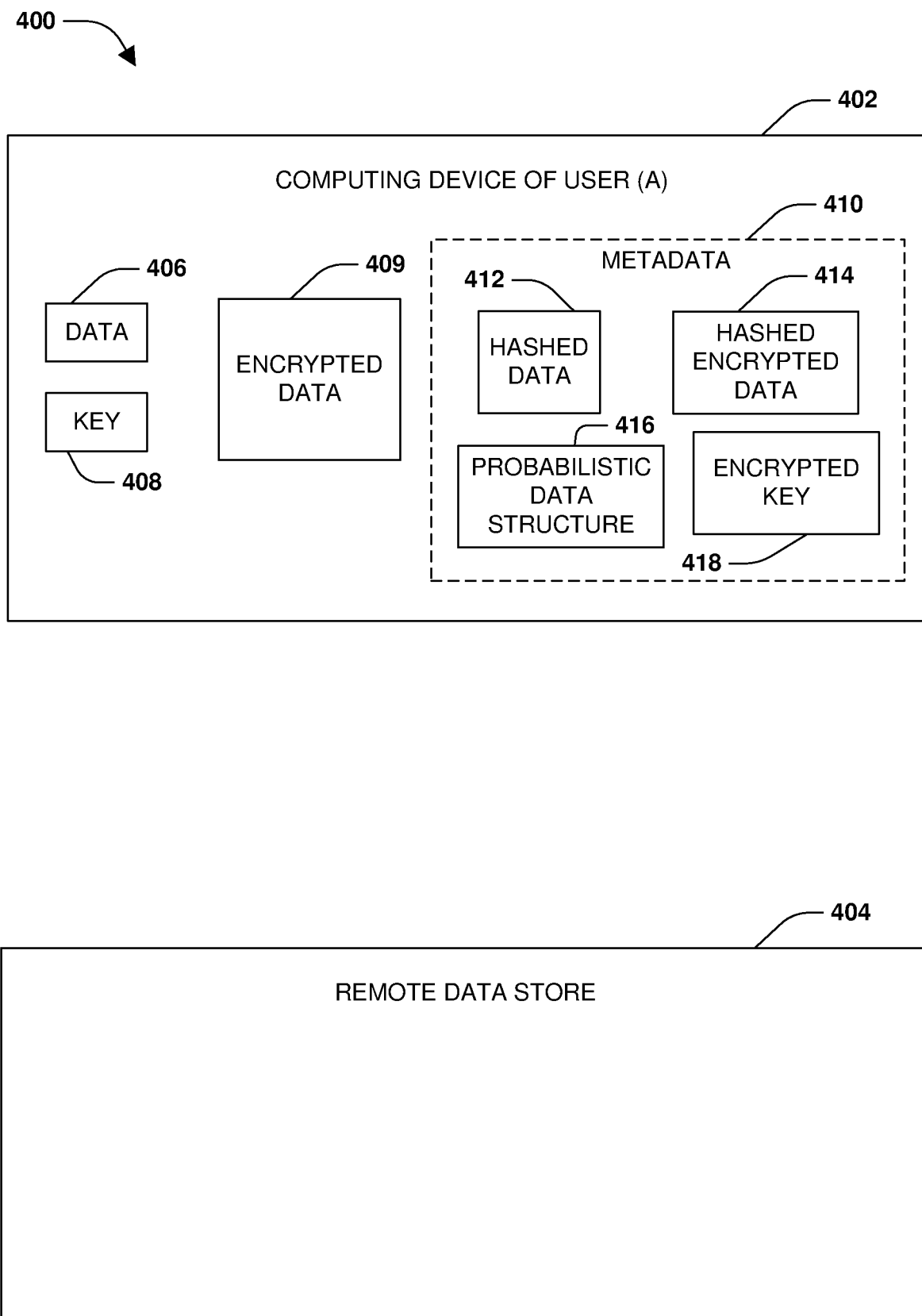
FIG. 4E is a component block diagram illustrating an example system for deduplicating encrypted data, where an encrypted key is created.
Figure 4F:
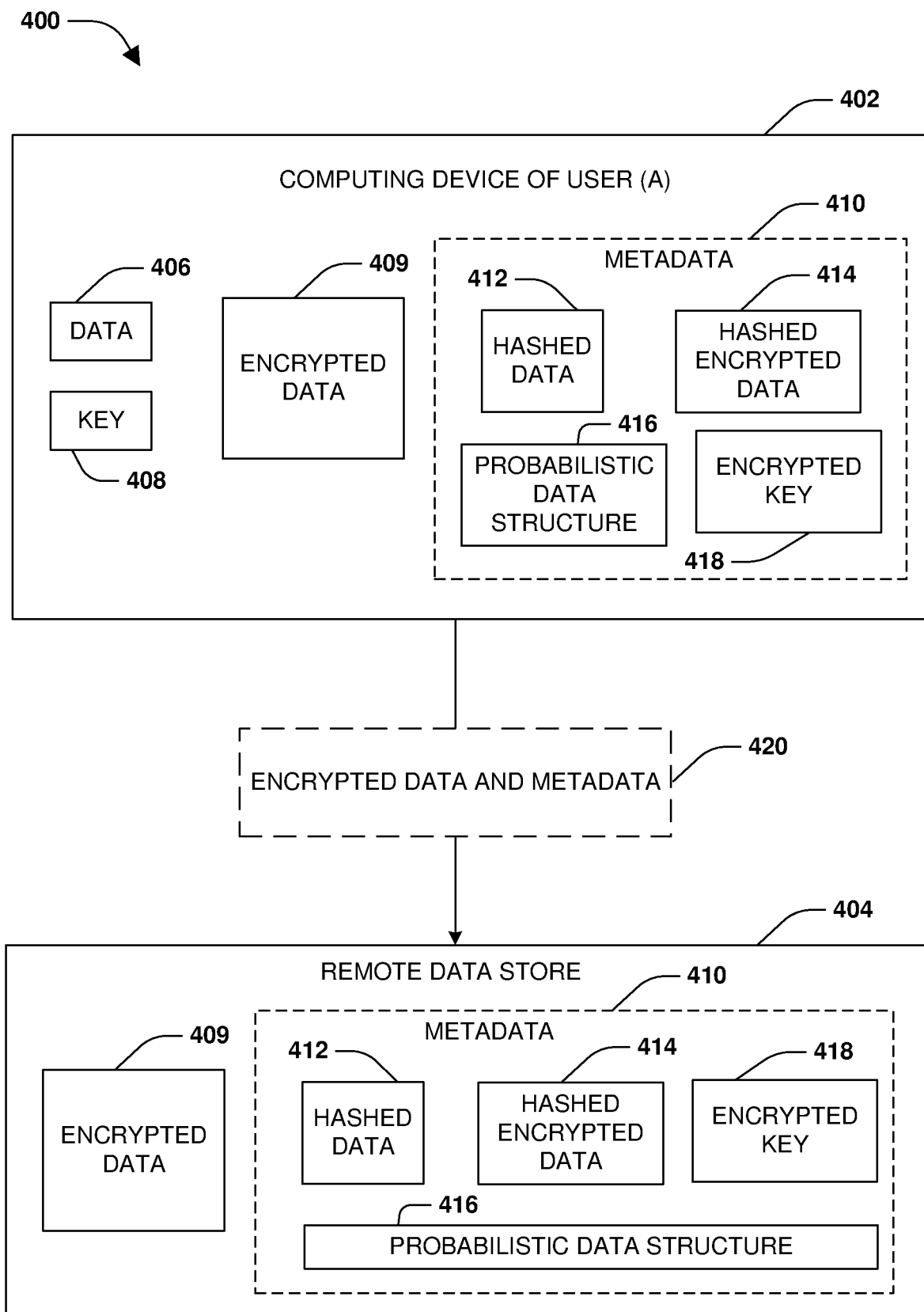
FIG. 4F is a component block diagram illustrating an example system for deduplicating encrypted data, where encrypted data and metadata is transmitted to a remote data store.
Figure 4G:
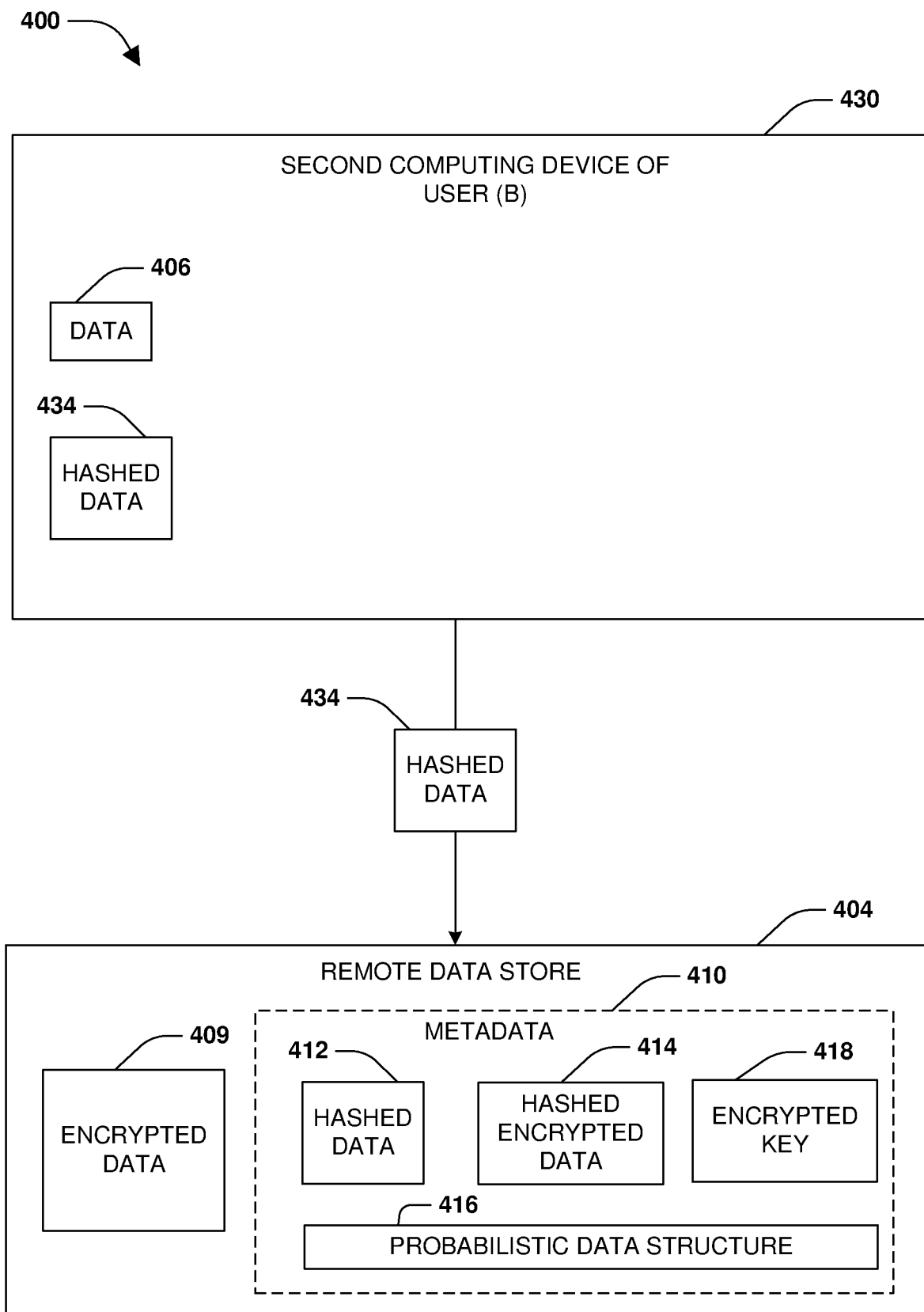
FIG. 4G is a component block diagram illustrating an example system for deduplicating encrypted data, where hashed data is created and transmitted to a remote data store.
Figure 4H:
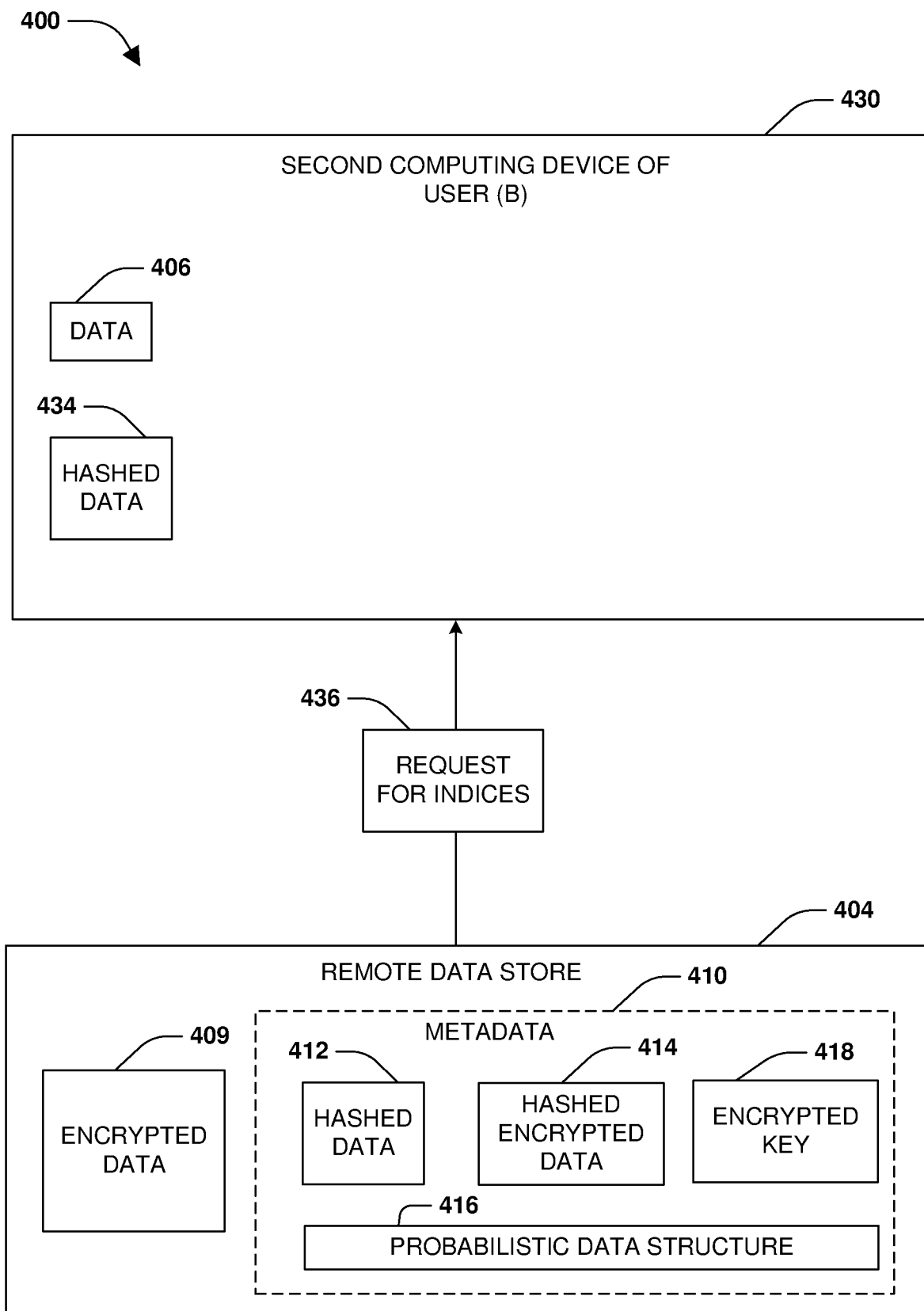
FIG. 4H is a component block diagram illustrating an example system for deduplicating encrypted data, where a remote data store requests indices of data.
Figure 4I:
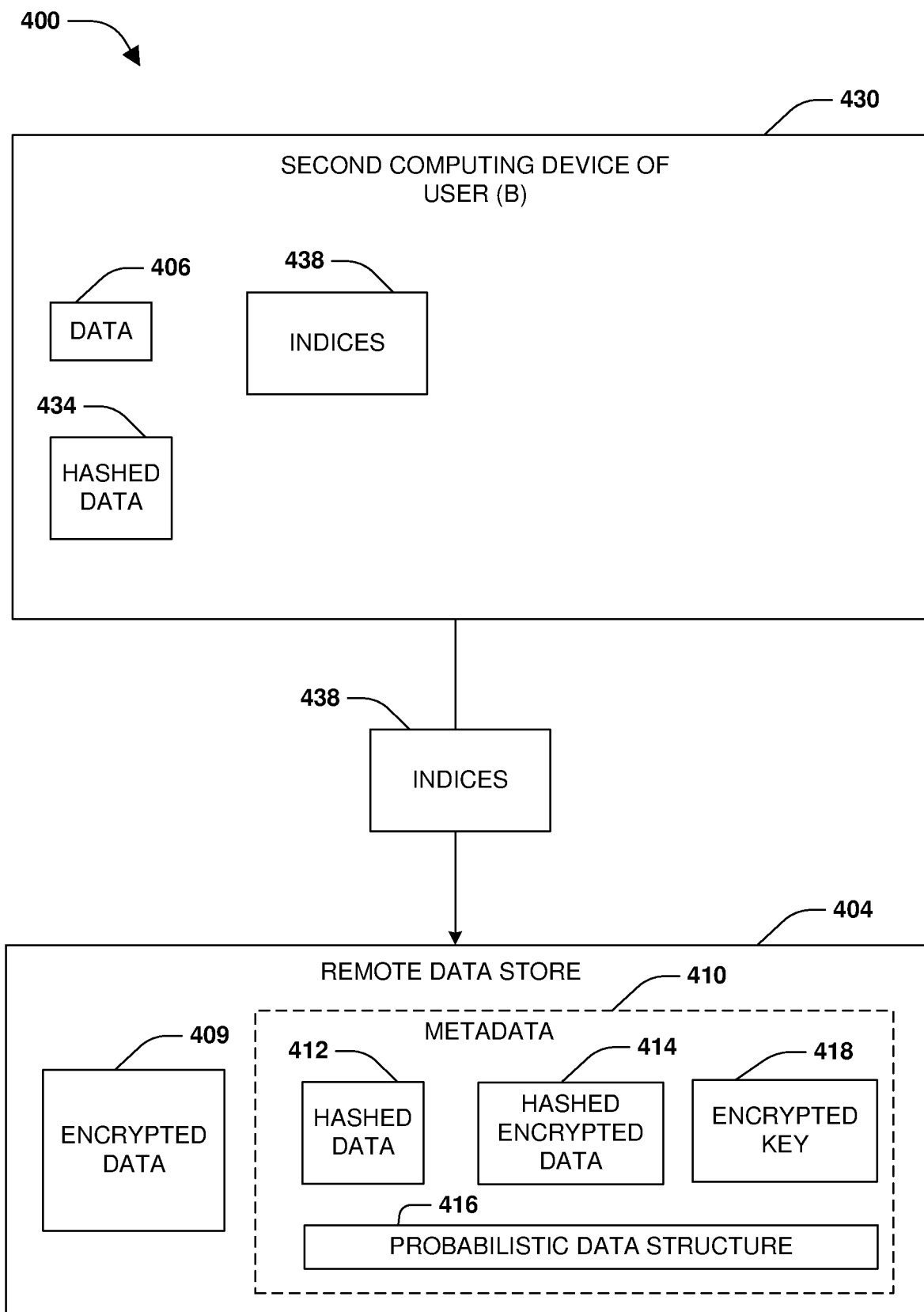
FIG. 4I is a component block diagram illustrating an example system for deduplicating encrypted data, where indices of data are created and transmitted to a remote data store.
Figure 4J:
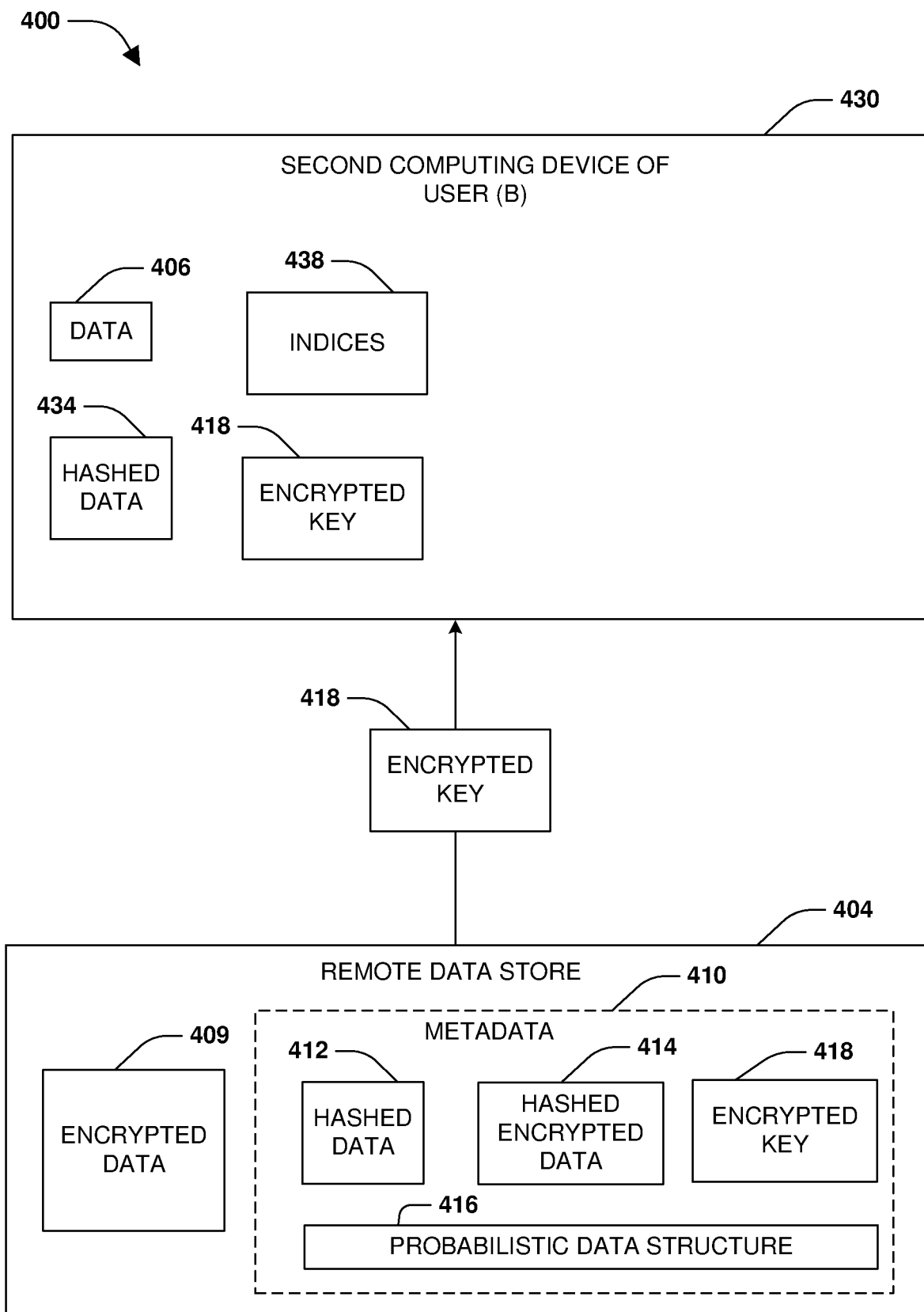
FIG. 4J is a component block diagram illustrating an example system for deduplicating encrypted data, where an encrypted key is received from a remote data store.
Figure 4K:
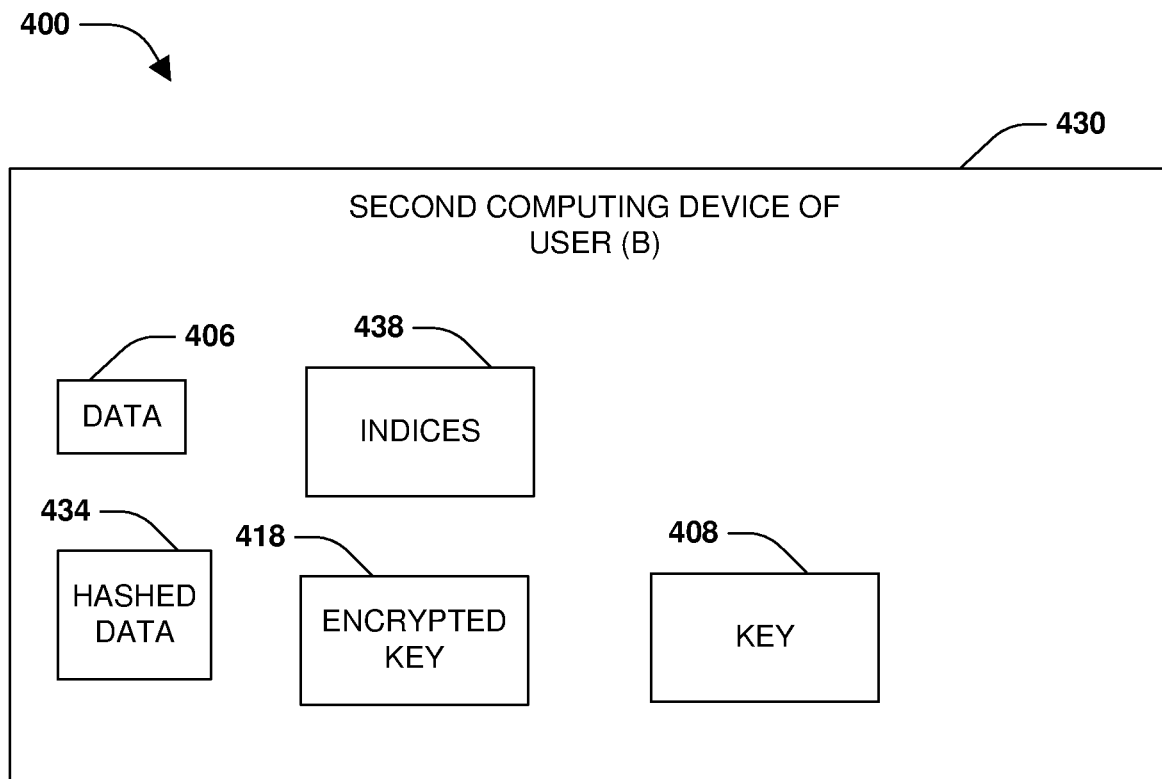
FIG. 4K is a component block diagram illustrating an example system for deduplicating encrypted data, where an encrypted key is decrypted using data to obtain a key.
Figure 4K:
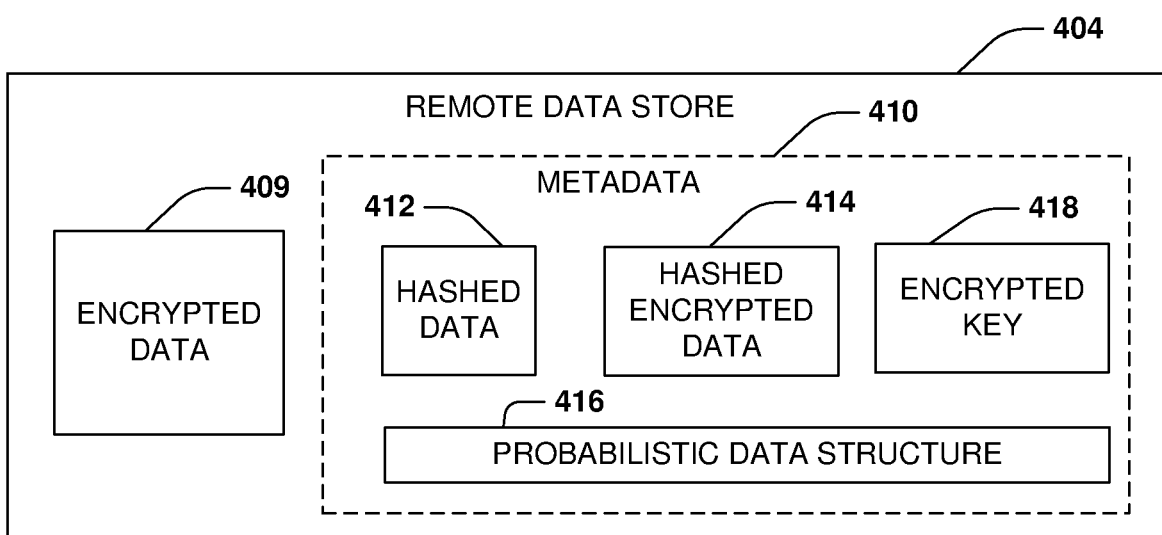
Figure 4L:
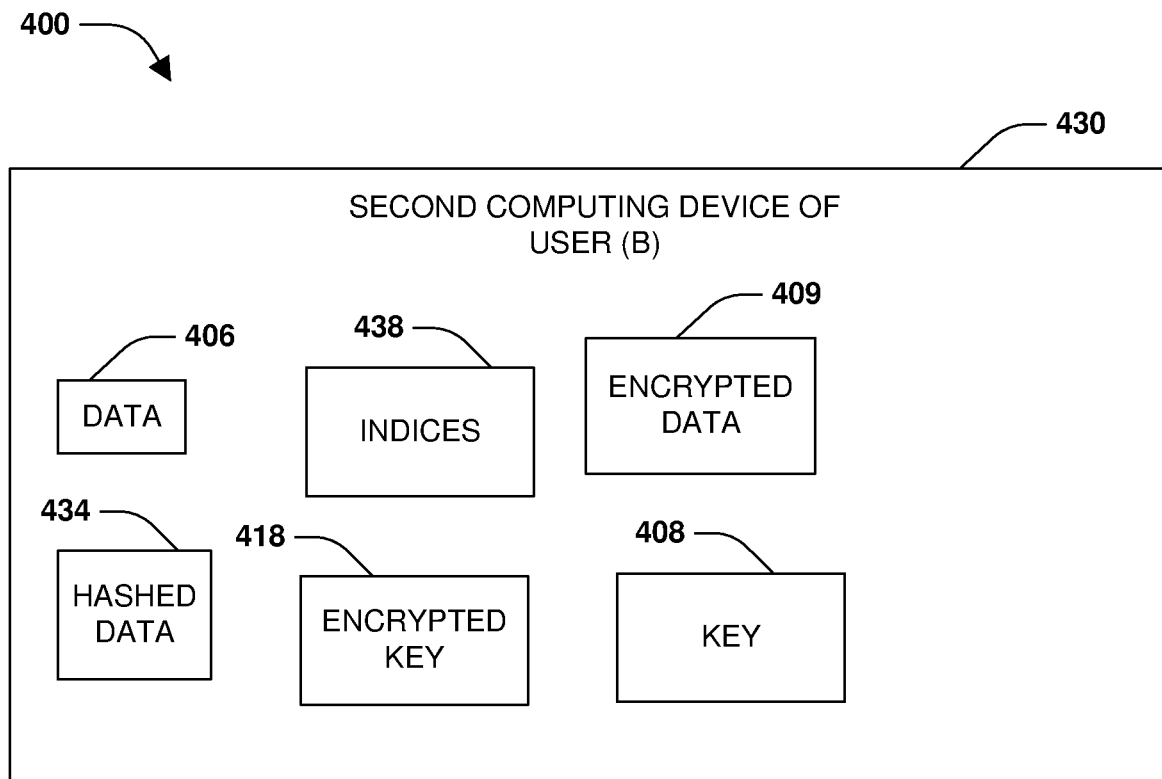
FIG. 4L is a component block diagram illustrating an example system for deduplicating encrypted data, where a key is used to encrypt data to create encrypted data.
Figure 4L:
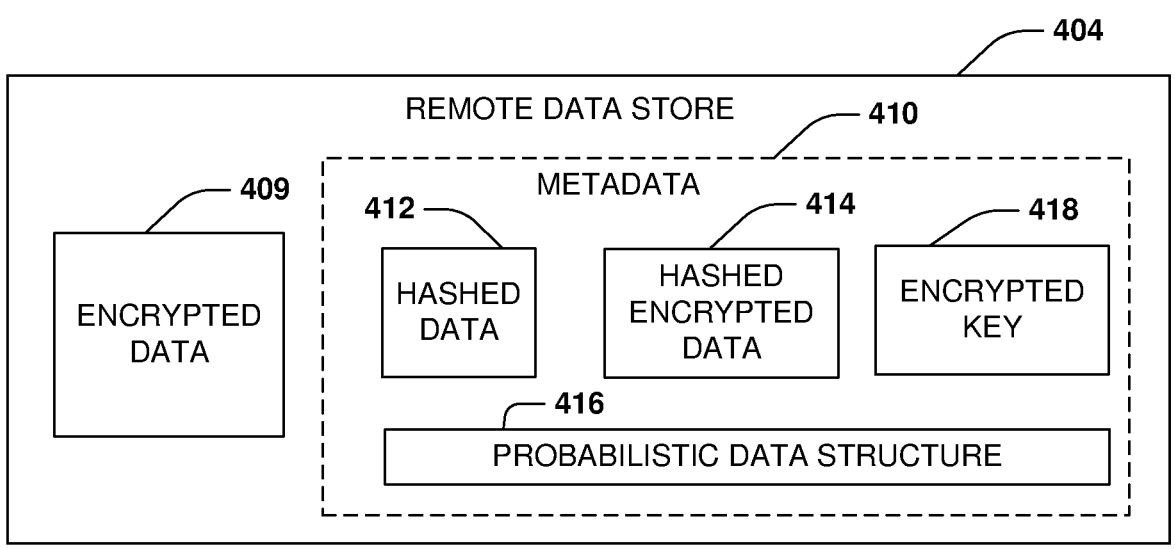
Figure 4M:
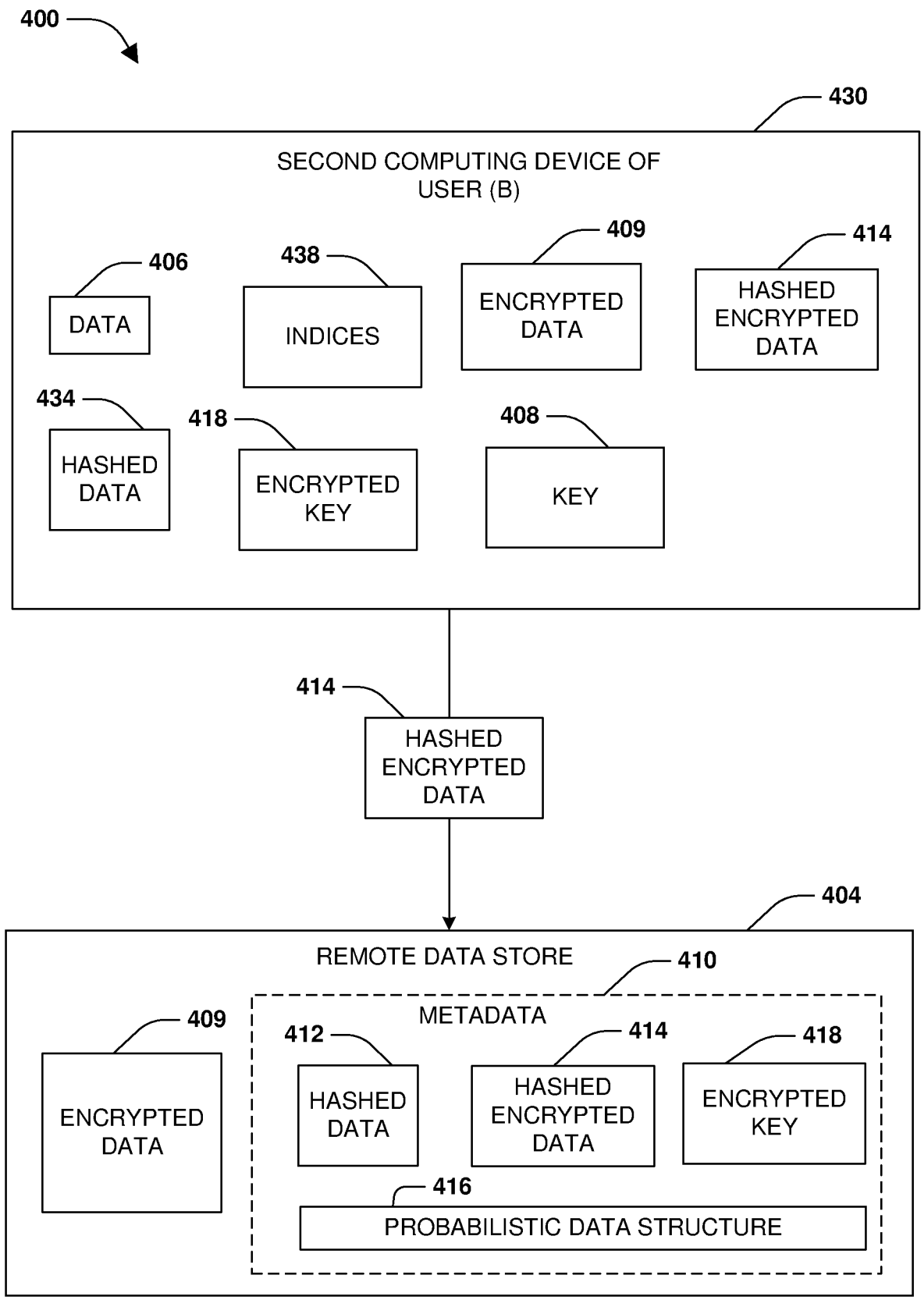
FIG. 4M is a component block diagram illustrating an example system for deduplicating encrypted data, where hashed encrypted data is created and transmitted to a remote data store.
Figure 4N:
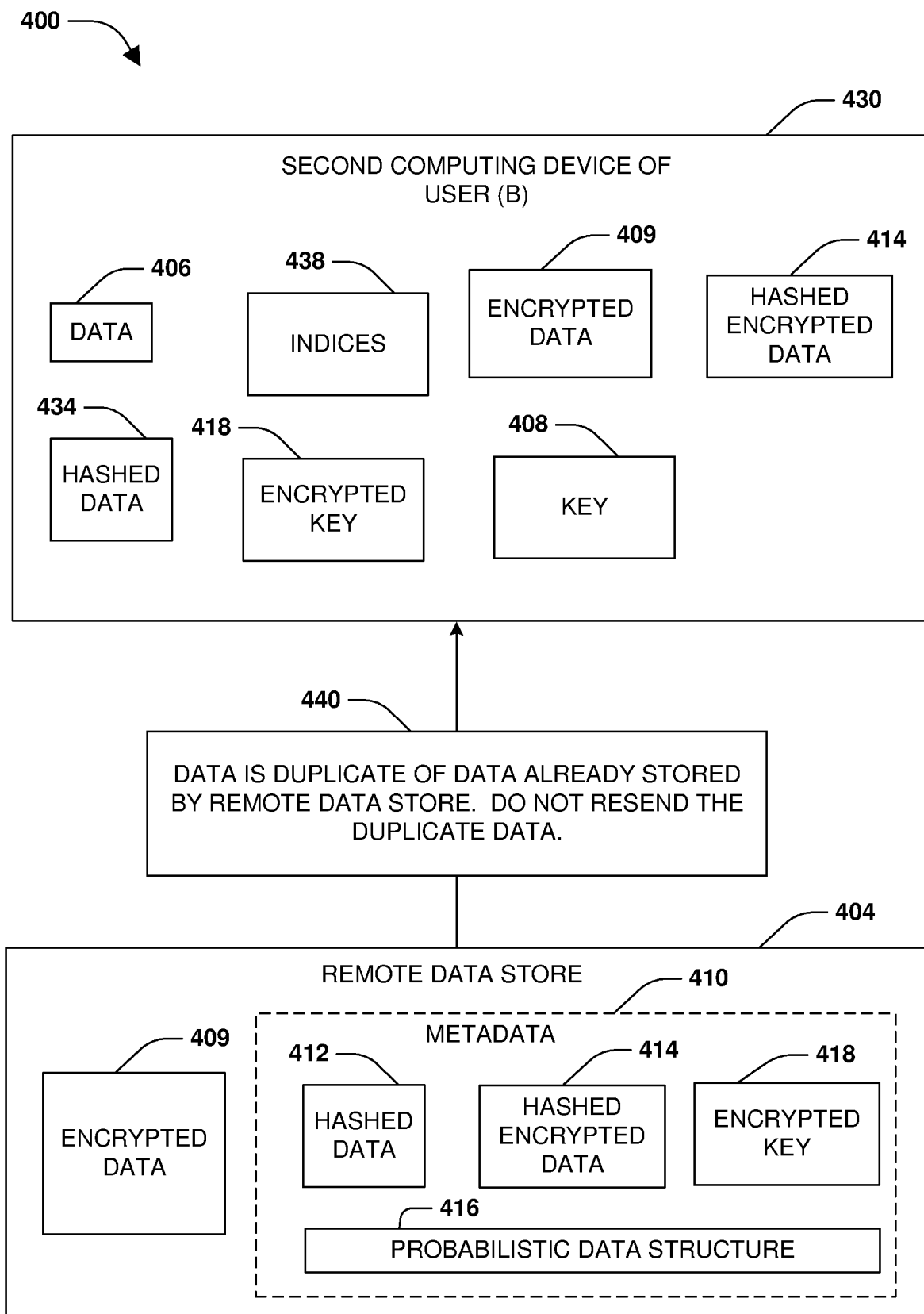
FIG. 4N is a component block diagram illustrating an example system for deduplicating encrypted data, where a remote data store deduplicates encrypted data.

One embodiment of deduplicating encrypted data is illustrated by an exemplary method 300 of FIG. 3 and further described in conjunction with system 400 of FIGS. 4A-4N. A remote data store 404 may be configured to store data for various users, as illustrated by FIG. 4A. In an example, the remote data store 404 may comprise an untrusted service (e.g., a service executed by a third party provider as opposed to a service locally executing on hardware maintained by a user), such as a cloud computing environment. A user may utilize a computing device (e.g., a laptop, a mobile device, a node, a server, a storage controller, dedicated hardware of a business, or any other type of device) to connect to the remote data store 404 over a network. For example, a user (A) may utilize a computing device 402 to connect to the remote data store 404 in order to store data 406 (e.g., a video file) within the remote data store 404. At 302, in order to provide for end-to-end encryption, the user (A) may utilize a key 408 to locally encrypt the data 406 at the computing device 402 to create encrypted data 409, as illustrated by FIG. 4B. The key 408 may be kept secret from the remote data store 404 and other users that do not have the same data 406.

At 304, the data 406 is hashed to create hashed data 412 and the encrypted data 409 is also hashed to create hashed encrypted data 414, as illustrated by FIG. 4C. The hashed data 412 and the hashed encrypted data 414 is stored as metadata 410, by the computing device 402 of user (A), which can be subsequently used by the remote data store 404 for deduplicating subsequent requests to store the data 406 (e.g., the same video file) into the remote data store 404 by the user (A) or other users.

At 306, a probabilistic data structure 416 of the data 406 is created for inclusion within the metadata 410, as illustrated by FIG. 4D. In an example, the probabilistic data structure 416 comprises a sampling of the data 406. The probabilistic data structure 416 may be used to check in log N time as to whether the data 406 matches other data. In an example, the probabilistic data structure 416 comprises a bloom filter, a Merkle tree, or other structure of the data 406.

At 308, the key 408 is encrypted based upon the data 406 using an encryption algorithm to create an encrypted key 418 for inclusion within the metadata 410, as illustrated by FIG. 4E. The encryption algorithm may be the same or different than the encryption algorithm used to encrypt the data 406 to create the encrypted data 409. The encrypted key 418 is created based upon the data 406 so that another user with the same data 406 (e.g., the same video file) can use that same data 406 to decrypt the encrypted key 418 in order to access the key 408. In particular, the key-encrypting-key is a fixed size sample of data, and thus two users with the same data can end up with the same sample, and thus can exchange keys. However, other users that do not have the same data 406 will be unable to decrypt the encrypted key 418. In this way, the encrypted key 418 may be provided to other users by the remote data store 404, after certain verification checks have been successfully performed, for performing deduplication to determine whether the other users indeed have the same data 406 or not.

At 310, the computing device 402 of user (A) transmits the encrypted data 409 and the metadata 410 to the remote data store 404, as illustrated by FIG. 4F. The remote data store 404 may store the encrypted data 409 for subsequent retrieval by the user (A). The remote data store 404 may store the metadata 410 for subsequent deduplication of requests received from the user (A) or other users that are attempting to store the same data 406 (e.g., the same video file) into the remote data store 404. That is, the hashed data 412, the hashed encrypted data 414, the encrypted key 418, and the probabilistic data structure 416 within the metadata 410 can be used by the remote data store 404 and another device to determine whether the other device is attempting to store the same data 406 into the remote data store 404. Instead of redundantly storing the same data 406, the remote data store 404 will instead store a reference for the other device to the encrypted data 409 so that the other device can also access the encrypted data 409. An example of the remote data store 404 performing deduplication using the metadata 410 is described with reference to FIGS. 4G-4N.

A second computing device 430 of a user (B) may be attempting to store data 406 (e.g., the same video file) to the remote data store 404, as illustrated by FIG. 4G. As opposed to transmitting the data 406 or an encrypted version of the data 406 to the remote data store 404, the second computing device 430 of user (B) and the remote data store 404 may utilize the metadata 410 to determine whether the data 406 of the second computing device 430 of user (B) is indeed the same as the data 406 of the computing device 402 of the user (A) that is stored as the encrypted data 409 within the remote data store 404. Accordingly, the second computing device 430 hashes the data 406 to create hashed data 434. The second computing device 430 transmits the hashed data 434 to the remote data store 404.

The remote data store 404 may determine whether the hashed data 434 generated by the second computing device 430 of user (B) matches the hashed data 412 within the metadata 410 generated by the computing device 402 of user (A). If the hashed data 434 does not match the hashed data 412 within the metadata 410 (or any other hashed data within metadata maintained by the remote data store 404 for deduplication), then the remote data store 404 may instruct the second computing device 430 to transmit the data 406 or an encrypted version of the data 406 to the remote data store 404 for storage (e.g., the data 406 of the second computing device 430 may pertain to a different video file or some other data such as an image). If the hashed data 434 matches the hashed data 412 within the metadata 410, then the remote data store 404 transmits a request 436 to the second computing device 430 for indices of the data 406 because the data 406 of the second computing device 430 of the user (B) could be potentially the same as the data 406 stored by the computing device 402 of the user (A) as the encrypted data 409 within the remote data store 404 because the hashed data 434 matched the hashed data 412 within the metadata 410, as illustrated by FIG. 4H.

Upon receiving the request 436 from the remote data store 404, the second computing device 430 identifies the indices 438 of the data 406, as illustrated by FIG. 4I. The indices 438 may correspond to offsets of the data 406 (e.g., offset 100, offset 200, etc.). In an example, the indices 438 may be stored within the Merkle tree, the bloom filter, or other structure. The second computing device 430 transmits the indices 438, such as the Merkle tree, to the remote data store 404 for further evaluation as to whether the data 406 of the second computing device 430 of the user (B) could be potentially the same as the data 406 stored by the computing device 402 of the user (A) as the encrypted data 409 within the remote data store 404.

The remote data store 404 may determine whether the indices 438 match the probabilistic data structure 416. Since the indices 438 are derived from the data 406 stored by the second computing device 430 (e.g., the indices 438 are derived from offsets of the data 406) and the probabilistic data structure 416 is derived from the data 406 (e.g., comprises a sample of the data 406) stored by the first computing device 402, the data 406 maintained by the second computing device 430 of the user (B) could potentially be the same as the data 406 stored by computing device 402 of user (A) as the encrypted data 409 within the remote data store 404. Otherwise, if the indices 438 do not match the probabilistic data structure 416 within the metadata 410 (or any other probabilistic data structures within metadata maintained by the remote data store 404 for deduplication), then the remote data store 404 may instruct the second computing device 430 to transmit an encrypted version of the data 406 to the remote data store 404 for storage. This is because the data 406 maintained by the second computing device 430 of the user (B) is not a duplicate of the data 406 stored by the computing device 402 of user (A) as the encrypted data 409 within the remote data store 404 (e.g., the data 406 of the second computing device 430 may pertain to a different video file or some other data such as an image).

Based upon the indices 438 matching the probabilistic data structure 416, the remote data store 404 may have established enough confidence that the data 406 stored by the second computing device 430 of user (B) could be the same as the data 406 stored by the computing device of user (A) as the encrypted data 409 within the remote data store 404. Accordingly, the remote data store 404 transmits the encrypted key 418 from the metadata 410 to the second computing device 430 of the user (B), as illustrated by FIG. 4J. The encrypted key 418 was created by the computing device 402 of user (A) based upon the data 406, such as a fixed size sample of the data 406, maintained by the computing device 402 of user (A). Thus, if the second computing device 430 of user (B) has the same data 406, then the second computing device 430 can use the same data 406 to decrypt the encrypted key 418 to obtain the key 408 used by the computing device 402 of user (A) to create the encrypted data 409 stored by the computing device 402 of user (A) to the remote data store 404, as illustrated by FIG. 4K. Otherwise, if the second computing device 430 of user (B) is unable to decrypt the encrypted key 418 using the data 406, then the second computing device 430 may transmit the data 406 or an encrypted version of the data 406 to the remote data store 404 for storage. This is because the data 406 maintained by the second computing device 430 of the user (B) is not a duplicated of the data 406 stored by the computing device 402 of user (A) as the encrypted data 409 within the remote data store 404 (e.g., the data 406 of the second computing device 430 may pertain to a different video file or some other data such as an image).

If the second computing device 430 is able to decrypt the encrypted key 418 to obtain the key 408, then the second computing device 430 uses the key 408 to encrypt the data 406 to create encrypted data 409, as illustrated by FIG. 4L. The encrypted data 409 is hashed to create a hash 414 of the encrypted data 409, as illustrated by FIG. 4M. As opposed to transmitting the entire encrypted data 409 to the remote data store 404 which wastes network bandwidth, the second computing device 430 transmits the hash 414 of the encrypted data 409 to the remote data store 404.

The remote data store 404 compares the hash 414 of the encrypted data 409 received from the second computing device 430 to the hash 414 of the encrypted data 409 within the metadata 410. If there is a match, then the remote data store 404 makes a final determination that the data 406 maintained by the second computing device 430 of user (B) is indeed a duplicate of the data 406 stored by the first computing device 402 of user (A) as the encrypted data 409 within the remote data store 404. Instead of requesting the encrypted data 409 (and/or the data 406) from the second computing device 430, the remote data store 404 transmits a message 440 to the second computing device 430, as illustrated by FIG. 4N. The message 440 indicates that the data 406 maintained by the second computing device 430 has been deduplicated and is already stored within the remote data store 404 as the encrypted data 409. The message 440 instructs the second computing device 430 to not send the encrypted data 409 and/or the data 406 because the encrypted data 409 is already stored by the remote data store 404. The remote data store 404 may increment a reference count for the encrypted data 409 to indicate that the user (B) is also an owner of the encrypted data 409. In this way, both the user (A) and the user (B) are provided with access to the encrypted data 409, which remains encrypted over the network and in the untrusted third-party remote storage node/server to provide end-to-end encryption, while still being deduplicated by the remote data store 404 for storage savings.

Figure 5:
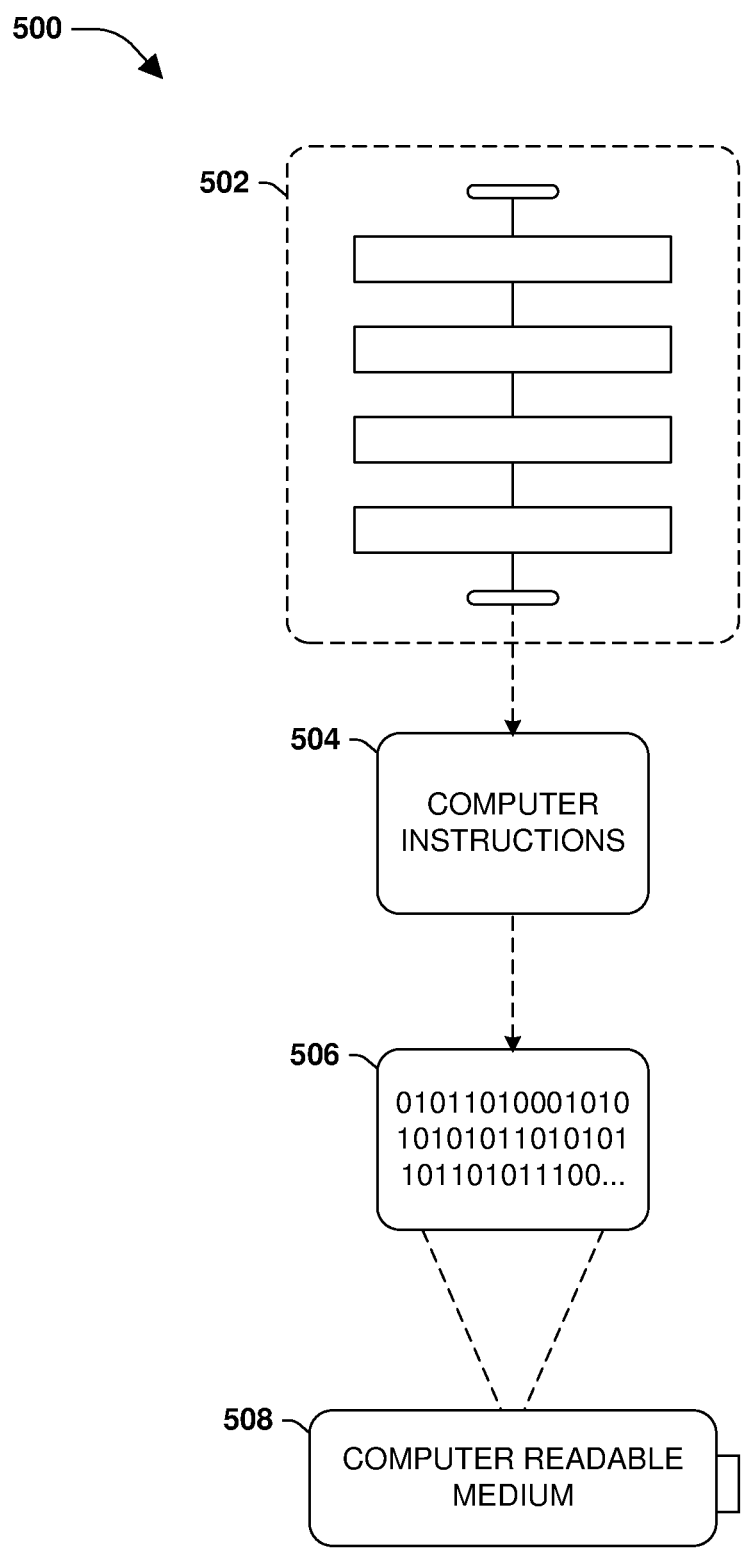
FIG. 5 is an example of a computer readable medium in which an embodiment of the invention may be implemented.

Still another embodiment involves a computer-readable medium 500 comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4N, for example. Many such computer-readable media are contemplated to operate in accordance with the techniques presented herein.

Figure 6:
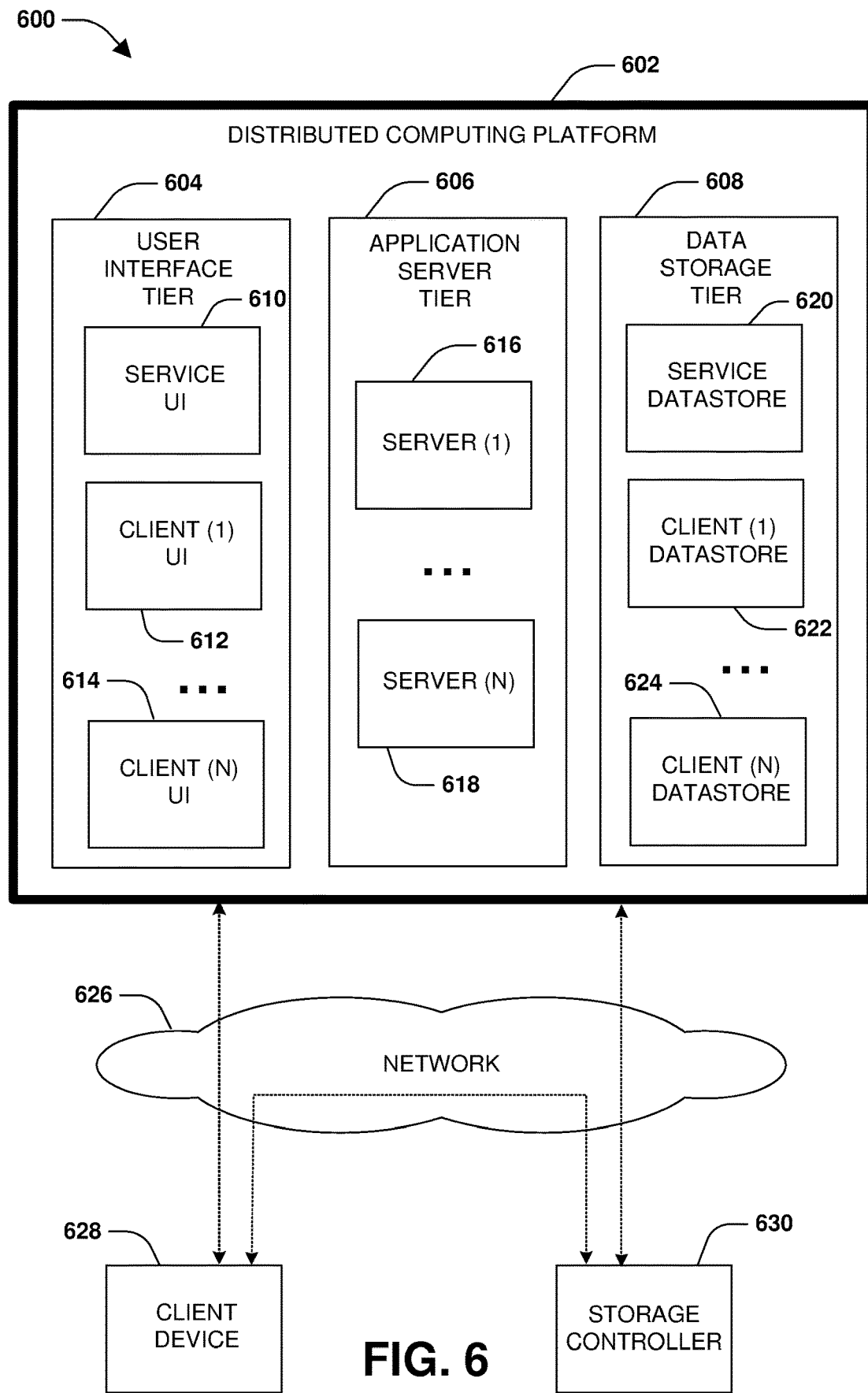
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SMVs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROMS), CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    encrypting data using a key to create encrypted data and encrypting the key based upon the data to create an encrypted key;
    hashing the data to create hashed data and hashing the encrypted data to create hashed encrypted data;
    transmitting the encrypted data and metadata comprising the hashed data, the hashed encrypted data, a probabilistic data structure of the data, and the encrypted key to a remote data store for storage;
    identifying indices of second data to store within the remote data store in response to receiving a request generated by the remote data store based upon the remote data store matching second hashed data of the second data to the hashed data, wherein the indices are transmitted to the remote data store;
    receiving the encrypted key from the remote data store based upon the indices matching the probabilistic data structure; and
    utilizing a sample of the second data to decrypt the encrypted key to obtain a second key used to encrypt the second data to create second encrypted data.

2. The method of claim 1, wherein the probabilistic data structure comprises a bloom filter of the data.

3. The method of claim 1, wherein the metadata is used by the remote data store and a device to determine that the device is attempting to store a duplicate copy of the encrypted data within the remote data store.

4. The method of claim 1, comprising:
    hashing the second data to create the second hashed data that is transmitted to the remote data store.

5. The method of claim 1, wherein the second data is to be transmitted from a first device to the remote data store.

6. The method of claim 1, wherein the encrypted data and the metadata are stored by the remote data store for deduplication by the remote data store of subsequent requests to store the data within the remote data store.

7. The method of claim 1, wherein the probabilistic data structure comprises a Merkle tree of the data.

8. The method of claim 1, wherein the second encrypted data is deduplicated by the remote data store with respect to the encrypted data based upon second hashed encrypted data of the second encrypted data matching the hashed encrypted data.

9. The method of claim 1, comprising:
    transmitting second hashed encrypted data of the second encrypted data to the remote data store.

10. The method of claim 1, wherein the second encrypted data is deduplicated by the remote data store with respect to the encrypted data.

11. The method of claim 9, comprising:
    wherein a reference to the encrypted data is stored in place of the second encrypted data by the remote data store based upon the second hashed encrypted data matching the hashed encrypted data.

12. The method of claim 11, wherein a reference count maintained by the remote data store for the encrypted data is incremented to indicate that the second encrypted data is deduplicated with respect to the encrypted data.

13. The method of claim 11, comprising:
    receiving an indication that the second encrypted data is deduplicated with respect to the encrypted data by the remote data store.

14. The method of claim 13, wherein the indication instructs a first device comprising the second encrypted data to refrain from transmitting the second encrypted data to the remote data store.

15. A non-transitory machine readable medium comprising instructions for performing a method, which when executed by a machine, causes the machine to:
    encrypt data using a key to create encrypted data and encrypt the key based upon the data to create an encrypted key;
    hash the data to create hashed data and hash the encrypted data to create hashed encrypted data;
    transmit the encrypted data and metadata comprising the hashed data, the hashed encrypted data, a probabilistic data structure of the data, and the encrypted key to a remote data store for storage;
    identify indices of second data to store within the remote data store in response to receiving a request generated by the remote data store based upon the remote data store matching second hashed data of the second data to the hashed data, wherein the indices are transmitted to the remote data store;
    receive the encrypted key from the remote data store based upon the indices matching the probabilistic data structure; and utilize a sample of the second data to decrypt the encrypted key to obtain a second key used to encrypt the second data to create second encrypted data.

16. The non-transitory machine readable medium of claim 15, wherein the instructions cause the machine to:
hash the second data to create the second hashed data that is transmitted to the remote data store.

17. The non-transitory machine readable medium of claim 15, wherein the encrypted data and the metadata are stored by the remote data store for deduplication by the remote data store of subsequent requests to store the data within the remote data store.

18. The non-transitory machine readable medium of claim 15, wherein the second encrypted data is deduplicated by the remote object store with respect to the encrypted data based upon second hashed encrypted data of the second encrypted data matching the hashed encrypted data.

19. The non-transitory machine readable medium of claim 15, wherein the instructions cause the machine to:
transmit second hashed encrypted data of the second encrypted data to the remote data store.

20. A computing device comprising:
a memory comprising machine executable code for performing a method; and
a processor coupled to the memory, the processor configured to execute the machine executable code to cause the processor to:
encrypt data using a key to create encrypted data and encrypt the key based upon the data to create an encrypted key;
hash the data to create hashed data and has the encrypted data to create hashed encrypted data;
transmit the encrypted data and metadata comprising the hashed data, the hashed encrypted data, a probabilistic data structure of the data, and the encrypted key to a remote data store for storage;
identify indices of second data to store within the remote data store in response to receiving a request generated by the remote data store based upon the remote data store matching second hashed data of the second data to the hashed data, wherein the indices are transmitted to the remote data store;
receive the encrypted key from the remote data store based upon the indices matching the probabilistic data structure; and
utilize a sample of the second data to decrypt the encrypted key to obtain a second key used to encrypt the second data to create second encrypted data.

* * * * *